US012731000B2

(12) United States Patent
Epler

(10) Patent No.: US 12,731,000 B2
(45) Date of Patent: Sep. 8, 2026

(54) CHIPLESS RFID-ENABLED LINER FREE LABELS AND ROLLS OF LINER FREE LABELS

(71) Applicant: Iconex LLC, Duluth, GA (US)

(72) Inventor: Robert Epler, Morristown, TN (US)

(73) Assignee: Iconex LLC, Atlanta, GA (US)

( * ) Notice: Subject to any disclaimer, the term of this patent is extended or adjusted under 35 U.S.C. 154(b) by 0 days.

(21) Appl. No.: 19/169,917

(22) Filed: Apr. 3, 2025

(65) Prior Publication Data

US 2025/0322199 A1 Oct. 16, 2025

Related U.S. Application Data

(60) Provisional application No. 63/632,876, filed on Apr. 11, 2024.

(51) Int. Cl.
*G06K 19/06* (2006.01)
*G06K 19/077* (2006.01)
(Continued)

(52) U.S. Cl.
CPC ... *G06K 19/0776* (2013.01); *G06K 19/07718* (2013.01); *G06K 19/07773* (2013.01);
(Continued)

(58) Field of Classification Search
CPC ......... G06K 19/07749; G06K 19/0723; G06K 19/077; G06K 19/0776; G06K 19/07773; G06K 19/07718
(Continued)

(56) References Cited

U.S. PATENT DOCUMENTS 8,342,402 B2 * 1/2013 Kriebel ............ G06K 19/07749 235/449
12,032,059 B2 * 7/2024 Chen-Ho ................ G01S 13/75
(Continued)

FOREIGN PATENT DOCUMENTS

EP 3537855 * 9/2019 ........... G06K 19/067
ES 2415983 * 7/2013 ......... G06K 19/0672
JP 2005141407 A 6/2005

OTHER PUBLICATIONS

"International Application Serial No. PCT/US2025/024155, International Search Report mailed Jun. 11, 2025", 2 pgs.
(Continued)

*Primary Examiner* — Daniel St Cyr
(74) *Attorney, Agent, or Firm* — Schwegman Lundberg & Woessner. P.A.

(57) ABSTRACT

A chipless RFID-enabled liner free label includes a substrate with an RFID antenna on the substrate and adhesive applied to the same side. The RFID antenna may be purchased from a third party, printed with conductive ink, formed from transferred conductive foil, or created as a combination of printed ink and foil. The adhesive may be flood coated or applied in discontinuous and/or continuous patches or patterns. The labels may include printed sense marks, or the antenna itself may function as a sense mark. A roll of such labels provides waste reduction benefits through elimination of the liner while maintaining RFID functionality without requiring chips. This technology in a roll format offers a cost-effective alternative to traditional chip-based RFID labels while preserving tracking capabilities.

18 Claims, 4 Drawing Sheets

(51) Int. Cl.
*G09F 3/00* (2006.01)
*G09F 3/10* (2006.01)
*H01Q 1/22* (2006.01)
*G09F 3/02* (2006.01)

(52) U.S. Cl.
CPC .............. *G09F 3/0297* (2013.01); *G09F 3/10* (2013.01); *H01Q 1/2208* (2013.01); *G09F 2003/0269* (2013.01)

(58) Field of Classification Search
USPC ............................... 235/492, 462.46, 472.02
See application file for complete search history.

(56) References Cited

U.S. PATENT DOCUMENTS

2005/0025553 A1 2/2005 Hohberger et al.
2006/0202830 A1* 9/2006 Scharfeld ......... G06K 19/07749 340/5.61
2009/0108994 A1* 4/2009 Keeton ...................... B41J 3/60 340/10.1
2009/0198596 A1 8/2009 Dolan et al.
2013/0074607 A1 3/2013 Jin et al.
2016/0189174 A1 6/2016 Heath
2018/0211718 A1 7/2018 Heath
2019/0156079 A1* 5/2019 Espinosa ................ G08C 17/02
2019/0156706 A1 5/2019 Mallya et al.
2021/0019484 A1 1/2021 Ladan et al.
2021/0375160 A1 12/2021 Vigunas et al.
2023/0286243 A1 9/2023 Kivimaki

OTHER PUBLICATIONS

"International Application Serial No. PCT/US2025/024152, International Search Report mailed May 23, 2025", 2 pgs.
"International Application Serial No. PCT/US2025/024152, Written Opinion mailed May 23, 2025", 5 pgs.

* cited by examiner

CHIPLESS RFID-ENABLED LINER FREE LABELS AND ROLLS OF LINER FREE LABELS

RELATED APPLICATIONS

The present application is a non-provisional application of provisional Application No. 63/632,876 entitled "Chip and Chipless RFID-Enabled Liner Free Labels and Rolls of Linerless Labels" filed on Apr. 11, 2024, the disclosure of which is incorporated by reference in its entirety herein.

BACKGROUND

Radio frequency identification (RFID) technology has revolutionized inventory management, supply chain logistics, and retail applications by enabling contactless identification and tracking of items. Traditional RFID systems typically require microchips to store and transmit data, adding complexity and cost to manufacturing processes. Meanwhile, traditional labels often include a liner that must be removed before application, creating waste and inefficiency in high-volume labeling operations. Environmental concerns and cost considerations continue to drive innovation in labeling technologies that can maintain functionality while reducing material waste.

DETAILED DESCRIPTION

As used herein, the term and phrase "linerless" and/or "liner free" may be used interchangeably and synonymously.

The present disclosure relates to chipless radio frequency identification (RFID) liner free labels and rolls of liner free labels. The embodiments described herein provide various approaches for incorporating RFID antennas onto liner free labels, which offer advantages in terms of waste reduction and increased label capacity per roll while maintaining the benefits of RFID technology for tracking and identification purposes.

The integration of chipless RFID technology with liner free labels presents unique technical challenges that the present disclosure addresses. By eliminating both the liner and the need for RFID chips and/or microchips while maintaining RFID functionality, the disclosed technology provides environmental benefits, cost savings, and improved efficiency in labeling operations.

In an embodiment, the chipless RFID antennas described herein operate by reflecting specific electromagnetic signatures when exposed to radio frequency signals, enabling identification without requiring an embedded microchip. This approach significantly reduces manufacturing costs compared to traditional chip-based RFID solutions while still providing reliable item identification capabilities.

Generally, and unlike chip-based RFID systems, chipless RFID technology relies on the electromagnetic properties of the antenna itself to create a unique signature. When radio waves hit the antenna, they are reflected back with specific phase and amplitude characteristics that can be used for identification. This passive reflection approach enables simpler manufacturing processes and lower per-label costs compared to chip-based alternatives.

The chipless RFID antennas described herein may be designed to operate in various frequency ranges, including but not limited to high frequency (HF) at 13.56 MHz and ultra-high frequency (UHF) at 860-960 MHz. The specific frequency range selection impacts the antenna design, with UHF antennas generally providing longer read ranges suitable for inventory tracking applications.

Figure 1:
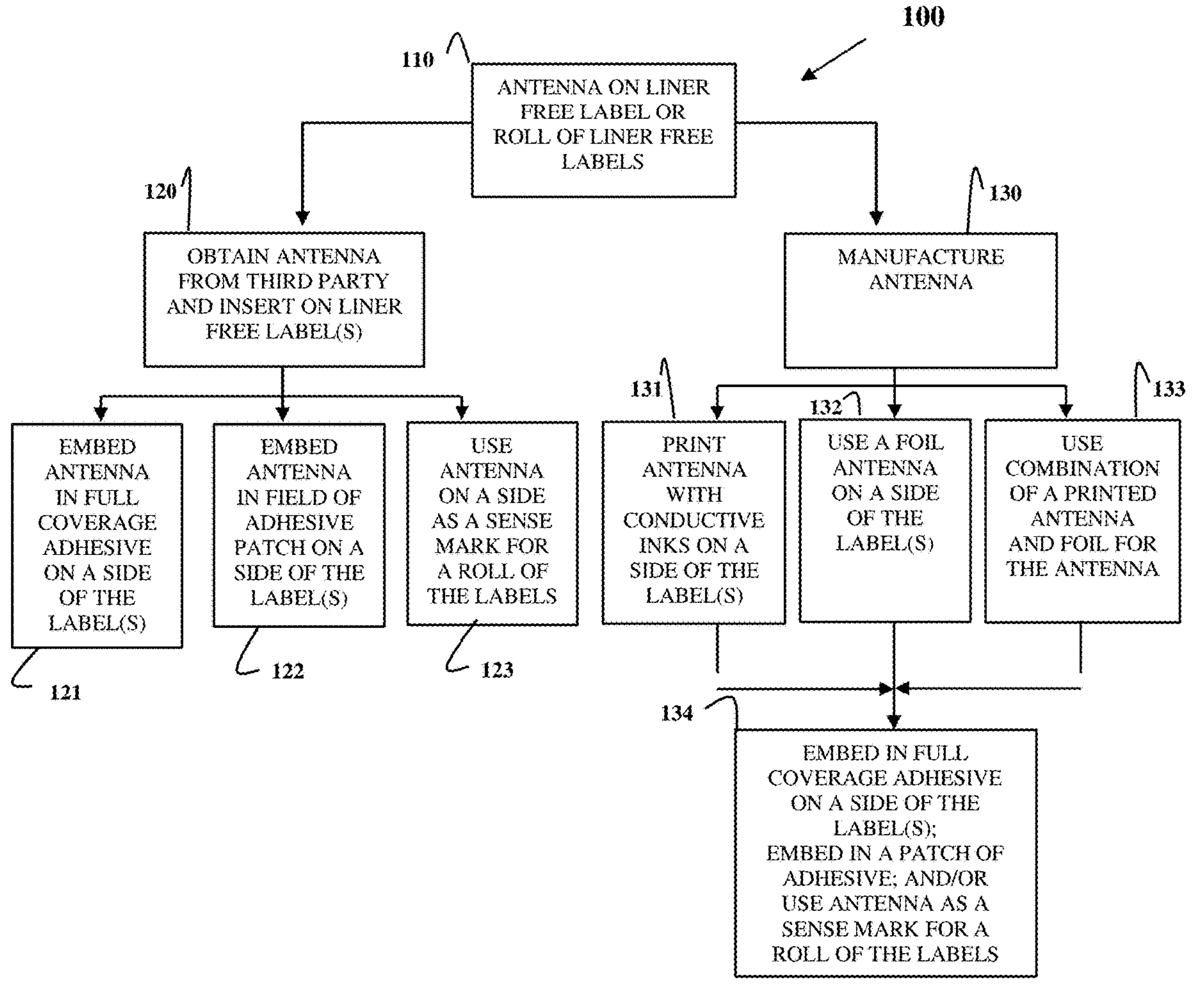
FIG. 1 is a diagram illustrating a method of making or assembling a chipless radio frequency identification (RFID) liner free label and roll of labels, according to an example embodiment.

FIG. 1 illustrates a method 100 of making or assembling a chipless RFID liner free label or roll of liner free labels. The method illustrates two options for making a liner free label with an RFID antenna. The first option is illustrated at 120 and the second option is illustrated at 130.

At 110, the method 100 begins with obtaining an RFID antenna for use on a liner free label or roll of liner free labels. This can be accomplished through two main approaches: obtaining a third-party antenna and inserting it on the liner free label(s) at 120 or manufacturing the antenna internally at 130.

When obtaining a third-party antenna at 120, the antenna may be embedded in full coverage adhesive on a side of the label(s) at 121, embedded in a field of an adhesive patch on a side of the label(s) at 122, or used as a sense mark for a roll of the labels at 123.

When manufacturing the antenna internally at 130, the antenna may be printed with conductive inks on a side of the label(s) at 131, implemented as a foil antenna on a side of the label(s) at 132, or created using a combination of a printed antenna and foil for the antenna at 133. After manufacturing the antenna, it may be embedded in full coverage adhesive on a side of the label(s), embedded in a patch of adhesive, or embedded in a patch pattern of adhesive at 134. The antenna may also be used as a sense mark for a roll of the labels at 134.

When printing antennas with conductive inks at 131, the process may involve screen printing, flexographic printing, rotogravure printing, lithography/offset printing, and/or digital printing techniques depending on the production volume and precision requirements. The foil antennas at 132 may be created through hot stamping, cold foil transfer, or lamination processes. The combination approach at 133 leverages the advantages of both methods, using printed elements for complex patterns and foil elements for areas requiring higher conductivity.

In an embodiment, when obtaining a third-party antenna at 120, the antenna may be purchased from an original equipment manufacturer (OEM) and directly integrated onto the liner free label. This approach typically represents the quickest implementation path. The third-party antenna components may be pre-assembled and ready for integration.

In an embodiment, the method 100 enables selection of the most appropriate implementation approach based on cost considerations, implementation timeline requirements, and desired performance characteristics. The full coverage adhesive embedding approach at 121 and 134 provides uniform adhesion across the label surface, while the adhesive patch approach at 122 allows for strategic placement of adhesive only where needed. Using the RFID antenna as a sense mark at 123 and 134 reduces the need for additional printing while maintaining compatibility with automated label dispensing systems.

In an embodiment, the adhesive used for the labels include permanent adhesives, removable adhesives, repositionable adhesives, water-based repositionable adhesives, solvent-based repositionable adhesives, freezer or cold-temperature adhesives, high-tack adhesives, low-tack or ultra-removable adhesives, water-based adhesives, hot melt adhesives, solvent-based adhesives, silicone-based adhesives, ultraviolet (UV)-curable adhesives, or mixtures of one or more of the recited adhesives. In an embodiment, the permanent adhesives include rubber-based adhesives and/or acrylic adhesives. In an embodiment, the removable adhesives include rubber-based removable adhesives, acrylic-based removable adhesives, microsphere adhesives, silicone-based removable adhesives, water-based repositionable adhesives, and/or hot melt removable adhesives. In an embodiment, the adhesive may be applied in a single adhesive layer or in a combination of multiple adhesive layers as adhesive bumps atop one another.

In an embodiment, sense marks are printed on the backside of the substrate to delineate between individual labels within the roll. In an embodiment, the antenna serves as a sense mark on the backside of the individual labels of the roll. In an embodiment, the roll of liner free labels do not include any sense marks.

In an embodiment, a side or a front side of the single substrate used for the roll of liner free labels includes a release coating deposited over a thermally activated print coating. This permits the single substrate to be wound into a roll with the front side released from the backside adhesive when being unwound by a printer. The release coating may include a water-based release coating, a silicone-based release coating, a UV-cured silicone release coating, a fluoropolymer-based release coating, a non-silicone release coating, a mixture of water-based and silicone-based release coating, a solvent-based chemistry release coating, and other release coatings.

In an embodiment, the substrate is a film. In an embodiment, the substrate is paper-based material.

In an embodiment, the chipless RFID liner free labels described herein are designed to be compatible with existing thermal printers, existing automated label applicators, and/or existing RFID readers while providing enhanced label and package tracking capabilities. In an embodiment, the chipless RFID liner free labels may necessitate minimal modifications to existing equipment associated with existing thermal printers, existing automated label applicators, and/or existing RFID readers while providing enhanced tracking capabilities.

By combining chipless RFID technology with liner free labels, the present disclosure provides a solution that addresses both environmental concerns and cost considerations. The elimination of silicone chips reduces electronic waste, while the removal of liner material significantly decreases paper waste in high-volume labeling operations. This dual approach to waste reduction represents a substantial improvement over conventional labeling technologies.

The chipless RFID antennas can be read using specialized RFID readers that analyze the electromagnetic signature reflected by the antenna. These readers can be integrated into existing inventory management systems and supply chain processes, providing identification capabilities without the cost associated with chip-based RFID systems. The reading range may vary based on the antenna design, with typical effective ranges of several centimeters to a few meters depending on the specific implementation and reader power.

The reading distance of chipless RFID antennas is influenced by several factors, including the antenna design, reader power, and environmental conditions. By optimizing the antenna geometry and material properties, the reading distance can be maximized for specific applications. This allows for flexibility in deployment scenarios ranging from close-proximity item identification to longer-range inventory scanning.

Figure 2:
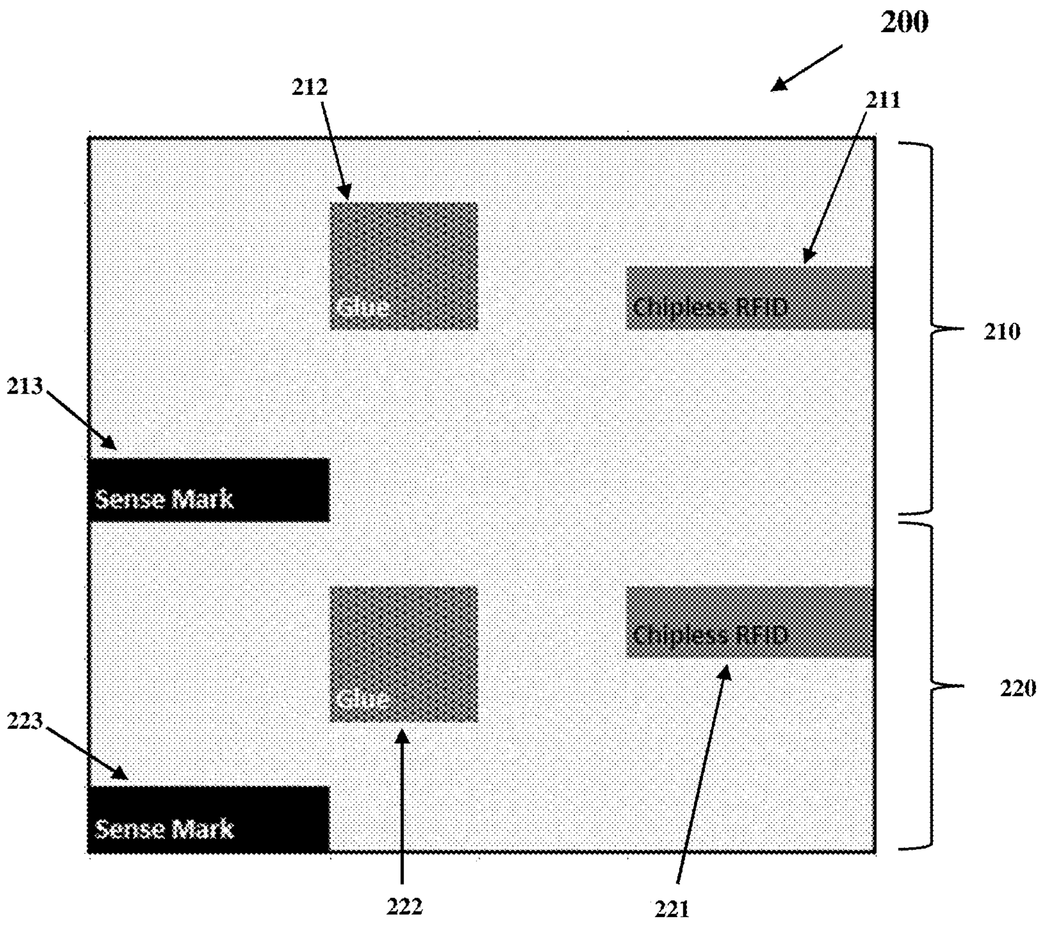
FIG. 2 is a diagram illustrating a roll of RFID-enabled chipless liner free labels with adhesive patches or patterns, RFID antennas, sense marks, and/or no sense marks according to an example embodiment.
Figure 3:
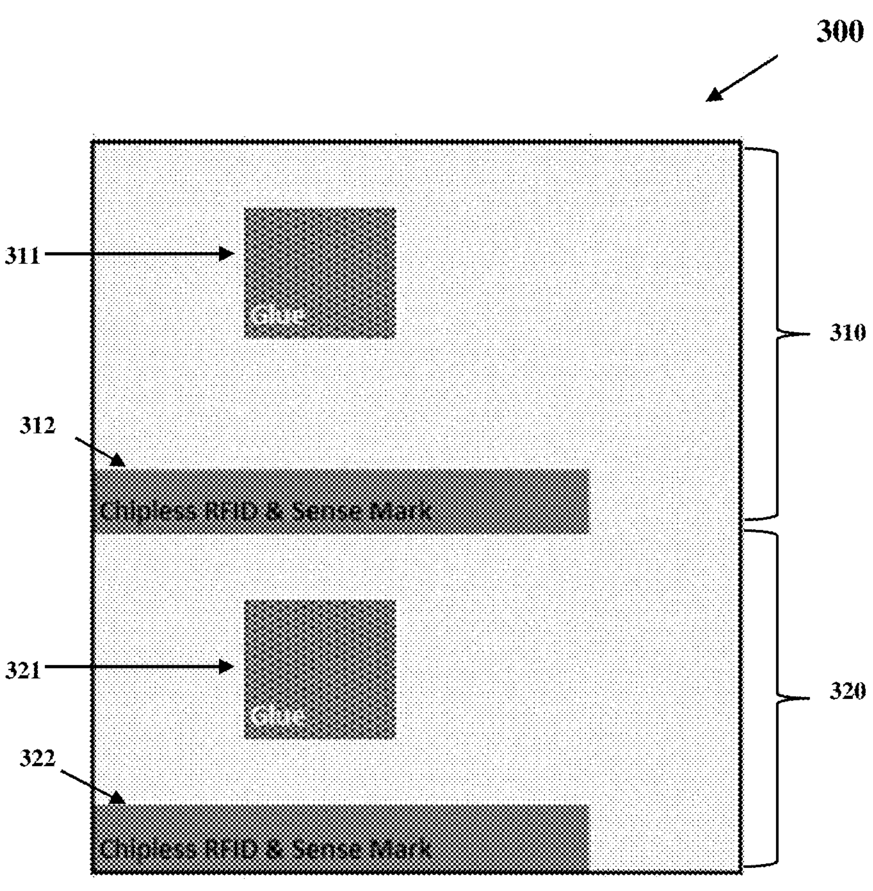
FIG. 3 is a diagram illustrating a roll of RFID-enabled chipless liner free labels with adhesive patches or patterns and combined RFID antennas and sense marks, according to an example embodiment.
Figure 4:
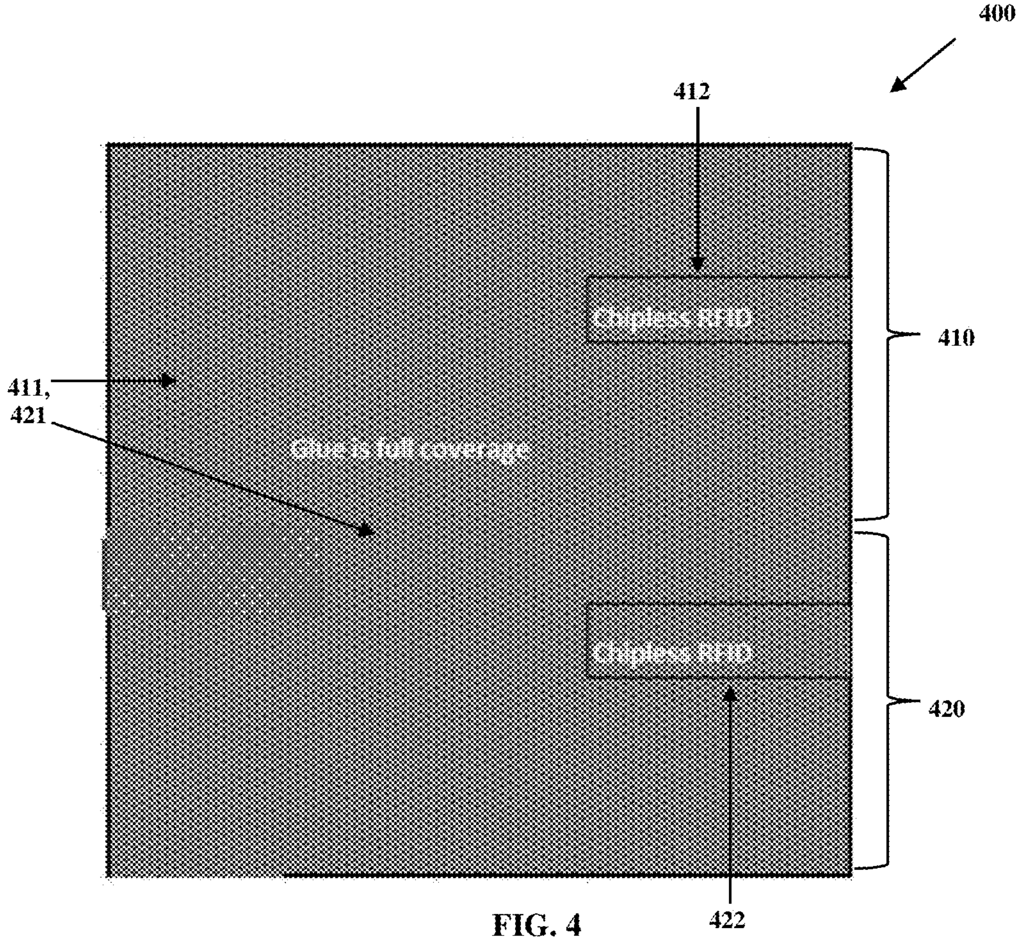
FIG. 4 is a diagram illustrating a roll of RFID-enabled chipless liner free labels with flood coated adhesive and RFID antennas with no sense marks, according to an example embodiment.

FIGS. 2-4 illustrate specific embodiments of rolls of chipless RFID liner free labels implementing the approaches described in FIG. 1. These embodiments demonstrate different configurations of adhesive application, RFID antenna placement, and sense mark implementation that may be selected based on specific application requirements, manufacturing considerations, and cost factors.

FIG. 2 is a diagram illustrating a roll 200 of RFID-enabled chipless liner free labels 210 and 220 with adhesive patches or patterns 212, RFID antennas 211 and 221, sense marks 213 and 223, and/or no sense marks, according to an example embodiment. The roll 200 of liner free labels 210 and 220 is shown in simplified form with only those components necessary for understanding the embodiment presented and described. It is noted that other components can be present such as one or more release coatings, print coatings, primer coatings, ink coatings, or other coatings. Moreover, FIG. 2 illustrates the backside of the roll 200 or substrate 200. The front side includes a variety of coatings such as thermal coatings, laser print coatings, inkjet print coatings, direct thermal print coatings, thermal transfer print coatings, one or more release coatings, and/or primer coatings, etc.

The roll 200 includes a single substrate 200, the backside of the roll/substrate 200 includes an RFID antenna 211 and 221 for each separately defined label 210 and 220 within the roll/substrate 200. In an embodiment, the RFID antennas 211 and 221 are printed with conductive ink on the backside. In an embodiment, the RFID antennas 211 and 221 are formed by transferring conductive foil on the backside of the roll/substrate 200. In an embodiment, one or more first portions of the RFID antennas 211 and 221 are printed in conductive ink while one or more second portions of the RFID antennas 211 and 221 are formed by transferring conductive foil on the backside of the roll/substrate.

The backside of the roll/substrate 200 also includes one or more adhesive areas 212 and 222. In an embodiment, the adhesive areas 212 and 222 are discontinuously disposed on the backside with areas free of adhesive therebetween. In an embodiment, the adhesive areas 212 and 222 are adhesive patches. In an embodiment, each adhesive patch includes a pattern of adhesive. In an embodiment, the adhesive patches are discontinuously or continuously disposed on the backside in patterns or in no patterns. In an embodiment, the adhesive is a repositionable adhesive, such as a microsphere adhesive. In an embodiment, the adhesive is a permanent repositionable adhesive, such as a hot melt or acrylic adhesive, which may be formulated as a repositionable adhesive. In an embodiment, the adhesive is a combination of different adhesive types or a mixture of adhesives. In an embodiment, the adhesive is disposed in a single layer. In an embodiment, the adhesive is disposed on the backside in two or more layers creating adhesive bumps within the adhesive areas 212 and 222.

The selection of adhesive type and pattern significantly impacts the performance and durability of the chipless RFID liner free label. Adhesive patterns are strategically designed to avoid interference with the antenna's electromagnetic properties while providing sufficient adhesion for the intended application surface. This balance between adhesive coverage and antenna performance represents a technical innovation in the disclosed technology.

In an embodiment, the backside of the roll/substrate 200 further includes printed sense marks 213 and 223. The sense marks permit a printer's optical sensor to identify a given sense mark and cut a given label from the roll/substrate 200 after the given label is imaged with custom indicia. The sense marks 213 and 223 delineate between individual labels 210 and 220 within the roll/substrate 200.

In an embodiment, the backside of the roll/substrate 200 includes no printed sense marks.

In an embodiment, the roll/substrate 200 include perforations made in the substrate 200 to separate adjacent labels within the roll 200.

In an embodiment, the front side of the roll/substrate 200 includes a print coating, such as a thermal transfer coating, a direct thermal coating, an inkjet coating, an ink coating, a dot matrix coating, and/or a laser coating. Overtop of the print coating is a release coating. The release coating may include a water-based release coating, a silicone-based release coating, a mixture of water-based and silicone-based release coating, a solvent-based chemistry release coating, and/or other release coatings.

FIG. 3 is a diagram illustrating a roll 300 of RFID-enabled chipless liner free labels 310 and 320 with adhesive patches or patterns 311 and 321 and combined RFID antennas and sense marks 312 and 322, according to an example embodiment. The roll 300 of liner free labels 310 and 320 is shown in simplified form with only those components necessary for understanding the embodiment presented and described. It is noted that other components can be present such as one or more release coatings, print coatings, ink coatings, primer coatings, or other coatings. Moreover, FIG. 3 illustrates the backside of the roll 300 or substrate 300. The front side includes a variety of coatings such as thermal coatings, laser print coatings, inkjet print coatings, direct thermal print coatings, ink coatings, thermal transfer print coatings, one or more release coatings, and/or primer coatings, etc.

Using the RFID antenna as a sense mark provides technical advantages over conventional printed sense marks, including reduced manufacturing steps, improved durability since no printed mark can wear off, and enhanced detection reliability through the electromagnetic signature of the antenna rather than relying solely on optical detection.

The roll 300 includes a single substrate 300, the backside of the roll/substrate 300 includes an RFID antenna 312 and 322 for each separately defined label 310 and 320 within the roll/substrate 300. In an embodiment, the RFID antennas 312 and 322 are printed with conductive ink on the backside. In an embodiment, the RFID antennas 312 and 322 are formed by transferring conductive foil on the backside of the roll/substrate 300. In an embodiment, one or more first portions of the RFID antennas 312 and 322 are printed in conductive ink while one or more second portions of the RFID antennas 312 and 322 are formed by transferring conductive foil on the backside of the roll/substrate 300.

The antenna 312 and 322 also functionally serve as sense marks on the backside of the roll/substrate 300. That is, a printer is enhanced to detect the antenna 312 and 322 and force a delay for a configured number of microsecond/milliseconds before stopping the roll 300 from advancing and cutting an individual label 310 or 320 from the roll 300. The printer determines a cutting location between adjacent labels 310 and 320 based on a corresponding chipless RFID antenna 312 or 322. This avoids the cutting through the antenna 312 and 322 and ensures that the printer cuts an individual label from the roll after the corresponding antenna 312 or 322 but before the adhesive area 311 or 321 of a next label. The locations of the antennas 312 and 322 are in a location of the backside of the roll 300 that a conventional sense mark would be printed on the backside of the roll.

The backside of the roll/substrate 300 also includes one or more adhesive areas 311 and 321. The adhesive areas 311 and 321 are discontinuously disposed on the backside with areas free of adhesive therebetween. In an embodiment, the adhesive areas 311 and 321 are adhesive patches. In an embodiment, each adhesive patch includes a pattern of adhesive. In an embodiment, the adhesive is a repositionable adhesive, such as a microsphere adhesive. In an embodiment, the adhesive is a permanent adhesive, such as a hot melt or acrylic adhesive, which may be formulated as a repositionable adhesive. In an embodiment, the adhesive is a combination of different adhesive types or a mixture of adhesives. In an embodiment, the adhesive is disposed in a single layer. In an embodiment, the adhesive is disposed on the backside in two or more layers creating adhesive bumps within the adhesive areas 311 and 321.

In an embodiment, the front side of the roll/substrate 300 includes a print coating, such as a thermal transfer coating, a direct thermal coating, an inkjet coating, a dot matrix coating, printed inks (e.g., a logo, a color, etc.), and/or a laser coating. Overtop of the print coating is a release coating. The release coating may include a water-based release coating, a silicone-based release coating, a mixture of water-based and silicone-based release coating, a solvent-based chemistry release coating, and/or other release coatings.

FIG. 4 is a diagram illustrating a roll 400 of RFID-enabled chipless liner free labels 410 and 420 with flood coated adhesive 411 and 421 and RFID antennas 412 and 422 with no sense marks, according to an example embodiment. The roll 400 of liner free labels 410 and 420 is shown in simplified form with only those components necessary for understanding the embodiment presented and described. It is noted that other components can be present such as one or more release coatings, print coatings, primer coatings, ink coatings, or other coatings. Moreover, FIG. 4 illustrates the backside of the roll 400 or substrate 400. The front side includes a variety of coatings such as thermal coatings, laser print coatings, inkjet print coatings, direct thermal print coatings, thermal transfer print coatings, one or more release coatings, and/or primer coatings, etc.

The design of the chipless RFID antenna is optimized for both electromagnetic performance and manufacturing efficiency. The antenna geometry, dimensions, and material composition are carefully selected to provide reliable identification capabilities while remaining compatible with high-volume production processes. This optimization process ensures consistent performance across large production runs of liner free labels.

The chipless RFID antenna design provides specific technical advantages over traditional RFID systems. By eliminating the need for a chip or microchip, the manufacturing process is simplified, reducing both production costs and environmental impact. The antenna's electromagnetic signature can be engineered to provide unique identifiers for inventory tracking while maintaining compatibility with existing RFID reading infrastructure with minimal modifications.

The roll 400 includes a single substrate 400, the backside of the roll/substrate 400 includes an RFID antenna 412 and 422 for each separately defined label 410 and 420 within the roll/substrate 400. In an embodiment, the RFID antennas 412 and 422 are printed with conductive ink on the backside. In an embodiment, the RFID antennas 412 and 422 are formed by transferring conductive foil on the backside of the roll/substrate 400. In an embodiment, one or more first portions of the RFID antennas 412 and 422 are printed in conductive ink while one or more second portions of the RFID antennas 412 and 422 are formed by transferring conductive foil on the backside of the roll/substrate.

The backside of the roll/substrate 400 includes no sense marks. In an embodiment, the printer is configured to avoid cutting through the antennas 412 and 422.

The backside of the roll/substrate 400 is flood coated with adhesive 411 and 421. In an embodiment, the left side and right side of the backside of the roll/substrate includes adhesive free zones that are free of adhesive. In an embodiment, the left side, right side, top side, and bottom side of the backside of the roll/substrate 400 includes adhesive free zones that are free of adhesive. In an embodiment, the adhesive is a repositionable adhesive, such as a microsphere adhesive. In an embodiment, the adhesive is a permanent adhesive, such as a hot melt or acrylic adhesive, which may be formulated as a repositionable adhesive. In an embodiment, the adhesive is a combination of different adhesive types or a mixture of adhesives. In an embodiment, the adhesive is disposed in a single layer. In an embodiment, the adhesive is disposed on the backside in two or more layers creating adhesive bumps within the adhesive areas 411 and 421.

The adhesive composition may be selected based on the specific application requirements. For applications requiring temporary adhesion, microsphere adhesives provide repositionability. For applications requiring permanent adhesion, acrylic or hot melt adhesives provide stronger bonds. The adhesive composition is formulated to be compatible with the chipless RFID antenna to ensure that the adhesive does not interfere with the antenna's electromagnetic properties.

In an embodiment, the front side of the roll/substrate 400 includes a print coating, such as a thermal transfer coating, a direct thermal coating, an inkjet coating, an ink coating, a dot matrix coating, and/or a laser coating. Overtop of the print coating is a release coating. The release coating may be a water-based release coating, a silicone-based release coating, a mixture of water-based and silicone-based release coating, a solvent-based chemistry release coating, and/or other release coatings.

In an embodiment, the chipless RFID antenna 410 and 420 of each liner free label is configured to respond to a specific radio frequency range.

Although the present invention is described with reference to certain preferred embodiments thereof, variations and modifications of the present invention can be affected within the spirit and scope of the following claims.

The invention claimed is:

1. A liner free label, comprising:

a substrate comprising a first side and a second side;

a chipless radio frequency identification (RFID) antenna formed on the substrate without an embedded microchip, the chipless RFID antenna configured to operate by reflecting specific electromagnetic signatures when exposed to radio frequency signals, enabling identification solely through electromagnetic properties of the chipless RFID antenna itself without requiring an embedded microchip;

an adhesive applied to a portion of the first side or the second side; and a release coating on the first side of the substrate, wherein the release coating enables the substrate to be wound into a roll with the first side released from the adhesive on the second side when being unwound by a printer.

2. The liner free label of claim 1, wherein the chipless RFID antenna is disposed on the second side of the substrate and the adhesive is applied to the second side of the substrate.

3. The liner free label of claim 1, wherein the adhesive is applied in full coverage along the first side or the second side, is applied in continuous adhesive patches, or is applied in discontinuous patches with areas free of adhesive between the discontinuous patches.

4. The liner free label of claim 1, wherein the chipless RFID antenna is formed using conductive ink printed directly onto the substrate.

5. The liner free label of claim 1, wherein the chipless RFID antenna is formed by transferring a conductive foil onto the substrate.

6. The liner free label of claim 1, wherein the chipless RFID antenna comprises a combination of a conductive ink and a conductive foil.

7. The liner free label of claim 1, further comprising a thermally activated print coating on the first side of the substrate.

8. The liner free label of claim 1, wherein the adhesive comprises a repositionable adhesive, a permanent adhesive, or a mixture of different adhesives.

9. The liner free label of claim 1, wherein the adhesive comprises multiple adhesive layers creating adhesive bumps on the substrate.

10. The liner free label of claim 1, further comprising a sense mark on the first side or the second side of the substrate.

11. The liner free label of claim 10, wherein the chipless RFID antenna is configured to be the sense mark.

12. A roll of liner free labels comprising:

a plurality of liner free labels comprising:

a substrate comprising a first side and a second side;

a chipless radio frequency identification (RFID) antenna formed on the substrate without an embedded microchip, the chipless RFID antenna configured to operate by reflecting specific electromagnetic signatures when exposed to radio frequency signals, enabling identification solely through electromagnetic properties of the chipless RFID antenna itself without requiring an embedded microchip;

an adhesive applied to a portion of the first side or the second side of the substrate; and a release coating on the first side of the substrate, wherein the release coating enables the substrate to be wound into the roll with the first side released from the adhesive on the second side when being unwound by a printer.

13. The roll of liner free labels of claim 12, wherein each chipless RFID antenna is configured to be detected by the printer and the printer determines a cutting location between adjacent labels based on a corresponding chipless RFID antenna.

14. The roll of liner free labels of claim 12, wherein the chipless RFID antenna of each liner free label is located along the first side or the second side so as to avoid being cut by the printer when the roll is separated into individual labels.

15. The roll of liner free labels of claim 12, wherein the adhesive is flood coated on the substrate with adhesive free zones along one or more of a left side or a right side of the substrate.

16. The roll of liner free labels of claim 12, wherein the chipless RFID antenna of each liner free label is configured to respond to a specific radio frequency range.

17. The roll of liner free labels of claim 12, wherein the substrate comprises a single layer material with a print coating on the first side, and the adhesive and the chipless RFID antenna on the second side.

18. The roll of liner free labels of claim 12, wherein adjacent liner free labels in the roll of liner free labels are separated by perforations made in the substrate.

* * * * *